United States Patent [19]

Esposito et al.

[11] Patent Number: 5,847,642

[45] Date of Patent: Dec. 8, 1998

[54] PEOPLE CARRIER SAFETY DEVICE

[75] Inventors: Raymond Esposito, Rocky Hill; David Gaspar Santos, Coventry, both of Conn.

[73] Assignee: Safe-T-Zone, Inc., Hartford, Conn.

[21] Appl. No.: 864,262

[22] Filed: May 28, 1997

[51] Int. Cl.$^6$ ..................................................... B60Q 1/00
[52] U.S. Cl. ........................ 340/433; 340/463; 340/464
[58] Field of Search ........................... 340/425.5, 431, 340/433, 463, 464

[56] References Cited

U.S. PATENT DOCUMENTS

| | | | |
|---|---|---|---|
| 2,144,813 | 1/1939 | Roan et al. | 177/329 |
| 3,788,268 | 1/1974 | Hiatt et al. | 116/28 R |
| 4,138,668 | 2/1979 | Latta, Jr. et al. | 340/130 |
| 4,816,804 | 3/1989 | Reavell | 340/433 |
| 4,825,192 | 4/1989 | Wells | 340/433 |
| 4,956,630 | 9/1990 | Wicker | 340/433 |
| 5,281,948 | 1/1994 | Estrada | 340/433 |
| 5,355,117 | 10/1994 | Jefferson | 340/425.5 |
| 5,357,239 | 10/1994 | Lamparter | 340/433 |
| 5,406,251 | 4/1995 | Leis | 340/433 |
| 5,781,120 | 7/1998 | Kuik | 340/433 |

*Primary Examiner*—Edward Lefkowitz
*Attorney, Agent, or Firm*—Perman & Green, LLP

[57] ABSTRACT

A safety zone guard resides in at least one articulated outwardly pivotable guard rail mounted to the transverse side of a vehicle and is deployable to an extended condition wherein in the deployed condition the guard extends perpendicularly to the transverse side of the vehicle to create a zone of safety therealong.

18 Claims, 9 Drawing Sheets

PEOPLE CARRIER SAFETY DEVICE

The present invention relates to a device for insuring safety of persons in offloading and onloading from and onto a motor vehicle adapted for mass transportation, and relates more particularly to a safety device for use in a bus carrying school children wherein at least one articulated rail is used to create a safety zone interrupting an otherwise travel path taken by motor vehicles by the bus during onloading or offloading.

It is desirable to create a zone of safety on the blind side of a vehicle adapted for mass transportation uses because often the individual who is left off will cross in front of the driver without being able to see beyond the bus structure. Creating a zone of safety to be temporarily used on the driver side of the bus forces a passing driver who does not heed the stop signs of the bus to move around the bus outside of the zone of safety. Thus, a person passing from and in front of the bus and attempting to cross the street, will have the benefit of viewing traffic in both lanes while standing in the protected zone.

Devices are known which create such safety zones using mechanisms that are articulated between open and closed conditions to block traffic otherwise passing by a school bus through such a safety zone. One such device is disclosed in U.S. Pat. No. 5,281,948 issued to Estrada on Jan. 25, 1994. In this patent, an articulated gate which is hinged at its midspan is provided. The gate is articulated to its extended condition from an otherwise retracted folded condition using an actuator which works against a chain spanning a midlength hinge connection of the two gate parts. Moreover, the components used to drive the gate between open and closed conditions are expensive. Such materials include an electric motor and a lead screw which, while being expensive, are also prone to breakdown given that such devices must work in all climates, and particularly in cold winter regions where snow and ice build up is common and the use of sand and salt cause adverse effects on the functionality of such parts. Also, in U.S. Pat. No. 4,825,192, issued to Wells on Apr. 25, 1989, a protective guard is disclosed which takes the form of telescopic cylindrical elements which again are driven between extended and retracted conditions via an electric lead screw. Again, the use of telescopically oriented elements to cause a protective guard to become extended perpendicularly to the length of the vehicle in order to create a safety zone has drawbacks in that such telescoping members would need to function in all types of environments, which for this structure may be problematic in that, for example, sand could embed on the telescoping parts and limit extension or retraction thereof.

Alternatively, attempts have been made to force offloading passengers to walk forwardly of the driver before attempting to cross the street, rather than creating a zone of safety in the street. Such devices are disclosed in U.S. Pat. No. 5,406,251 issued to Leis on Apr. 11, 1995 and in U.S. Pat. No. 4,956,630 issued to Wicker on Sep. 11, 1990. However, drawbacks with such devices still exist in that the person attempting to cross still is blinded by the body of the bus, and there is no guarantee of seeing an oncoming car in the lane immediately next to the outside of the vehicle.

Accordingly it is an object of the invention to provide an improved protective guard against traffic for a motor vehicle adapted for use in moving, for example, school children or the like and which is deployable from the transverse side of the vehicle for the purpose of creating a safety zone during loading and unloading of passengers.

Still a further object of the invention is to provide a guard of the aforementioned type whereby the guard is formed by one or more articulated rails which are deployed to an extended position from an otherwise retracted position by a simple and reliable mechanism.

Still a further object of the invention is to provide a guard of the aforementioned type wherein the at least one rail making up the guard in its retracted condition is streamlined with the outer surface of the transverse side of the vehicle.

It is still a further object of the invention is to provide a guard of the aforementioned type which is capable of being installed onto existing structure of a vehicle, such as a school bus, or can be installed as standard equipment thereon.

Yet a further object of the invention is to provide a guard of the aforementioned type wherein the rails making up the guard include indicia which make them highly visible to oncoming traffic.

Other objects and advantages of the present invention will become more apparent from the following description in the appended claims.

SUMMARY OF THE INVENTION

The invention resides in at least one articulated guard rail mounted to the transverse side of the vehicle and deployable to an extended condition wherein in the deployed condition the guard extends perpendicularly to the transverse side of a vehicle to create a zone of safety therealong. More specifically, the invention is found in a vehicle having a frame extending substantially in a lengthwise direction and having a sidewall panel disposed outwardly thereof defining a space therebetween. The safety zone system comprises a mount secured to the frame; hinge means disposed on a surface of the side wall panel and secured thereto for mounting an elongated rail to the vehicle for angular movement relative thereto. The sidewall panel having a passage formed therein permitting communication between the surface of the sidewall panel and the space. Actuator means is disposed within the space and connected between the mount and the hinge means for moving a part of the hinge means between an angular first position and an angular second position. Control means is provided for causing the actuator means to move the part of the hinge means between the angular first and second positions.

Ideally, the actuator is a double acting actuator having a slider rod with a free end pivotally connected to the hinge means and the hinge means has a socket part and a mounting block part extending inwardly perpendicularly thereto and the mounting block part has a length sufficient to pass through the passage in the sidewall panel of the vehicle when the hinge means is in a first angular position.

Preferably a guard rail is mounted within the socket part of the hinge means and the first angular position corresponds to the orientation of the socket part being disposed substantially parallel with the sidewall panel and the second angular position corresponds to the orientation of the socket part being disposed substantially perpendicularly to the sidewall panel.

In certain conditions, a stabilizing arm may be provided and extends between the mount and the sidewall panel, with the stabilizing arm having one end connected to the hinge means through the sidewall panel.

Preferably, two guard rails are used with a hinge means comprising a right hand opening hinge and the other hinge means comprising a left hand opening hinge and the control means causing simultaneous energization and reverse energization of the associated actuators.

A feature of the invention is providing the hinge means with a socket part defining an internal confine, the internal confine being correspondingly sized and shaped to receive the outer surface of one end of a guard rail inserted therewithin in a interference fit, the socket part including a port and a plug allowing air to be evacuated therefrom as the guard rail is inserted therewithin, and wherein the plug seals the internal confine to atmosphere after the guard rail is inserted.

DETAILED DESCRIPTION OF THE PREFERRED EMBODIMENT

Figure 1:
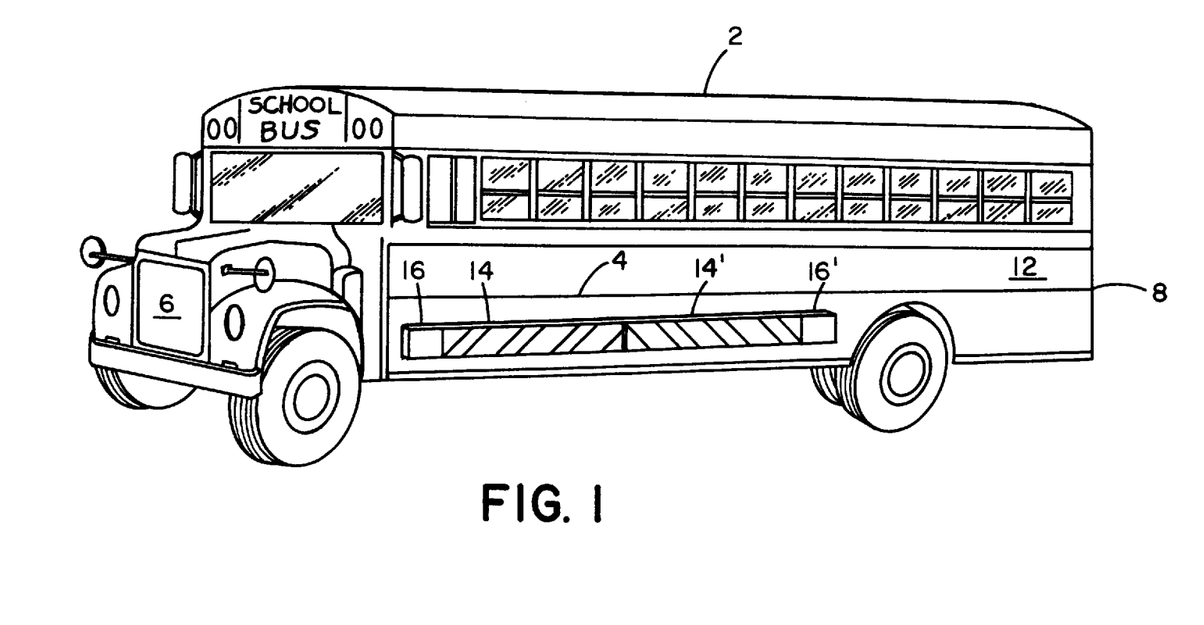
FIG. 1 is a perspective view of the vehicle seen along one side showing the zone guard in its closed condition.

Referring now to FIG. 1, a vehicle 2, which in the illustrated embodiment takes the form of a school bus, employs the invention generally referenced as element 4 and referred to hereinafter as the zone guard. The vehicle has a front end 6 and a rear end 8 with one and another parallel transverse long side panels 10 and 12 extending longitudinally of the length L of the vehicle and connected respectively to the front and rear ends of the vehicle.

The one side wall panel 10 is associated with the offloading side of the bus and contains the door through which loading and unloading of passengers occurs. The other opposite side panel 12 will be referred hereinafter to the blind side panel and is exposed to traffic during offloading situations.

Figure 2:
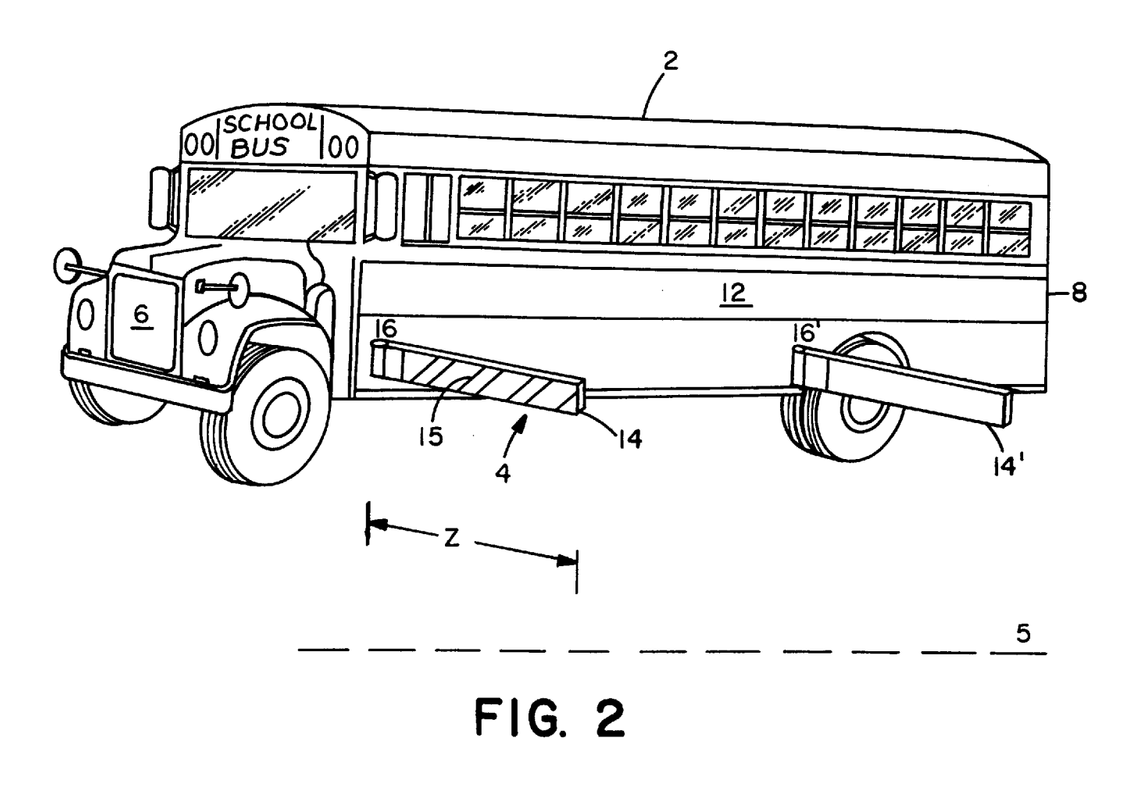
FIG. 2 is a perspective view of the vehicle along one side thereof showing the zone guard in its deployed or open condition.

As illustrated, the zone guard 4 is preferably disposed on the blind side panel 12 of the vehicle, but it is not outside of the purview of the present invention to dispose zone guards on both side wall panels 10 and 12 if it is so desired. As seen externally, the zone guard 4 includes guard rails 14,14' each of which is controllably hingedly connected to the side wall panel 12 through the intermediary of a power actuated hinge means 16, 16'. Each power actuated hinge means 16,16' is in turn connected to an associated actuator means 18,18' which acts between the chassis 20 of the vehicle 2 and the respective hinge for controllably deploying the associated guard rail 14,14' between a closed condition as illustrated in FIG. 1, and a deployed condition as illustrated in FIG. 2. It should be appreciated that in the closed condition of FIG. 1, each guard rail 14, 14' maintains itself in a substantially parallel orientation relative to the side wall panel 12 so as to maintain a streamlined and noninterfering appearance along the side wall panel 12. In the deployed condition of FIG. 2, each of the guard rails 14, 14' assumes an extended deployed condition wherein each of the rails is caused to be articulated under power to an extended position wherein each rail is disposed substantially perpendicularly to the length L of the vehicle 2 and the side wall panel 12 and blocks traffic in the immediate lane 5 to create a safety zone Z. It is noted that the outside faces 15, 15' of the guard rails 14, 14' are preferably painted with bright colored stripes in order to insure quick recognition of the safety zone by a passing driver.

Referring now to FIGS. 3, 4, 5 and 6, it should be seen that each guard rail 14, 14' is mounted to the vehicle panel 12 at two distinct points A and B which creates the zone Z to effect reliable and repetitive accurate deployment thereof. A first mount 26 is secured on the chassis 20 of the vehicle and is associated with the actuator means 18, and second mount 26' is secured on the chassis 20 and is associated with the actuator means 18'.

Figure 3:
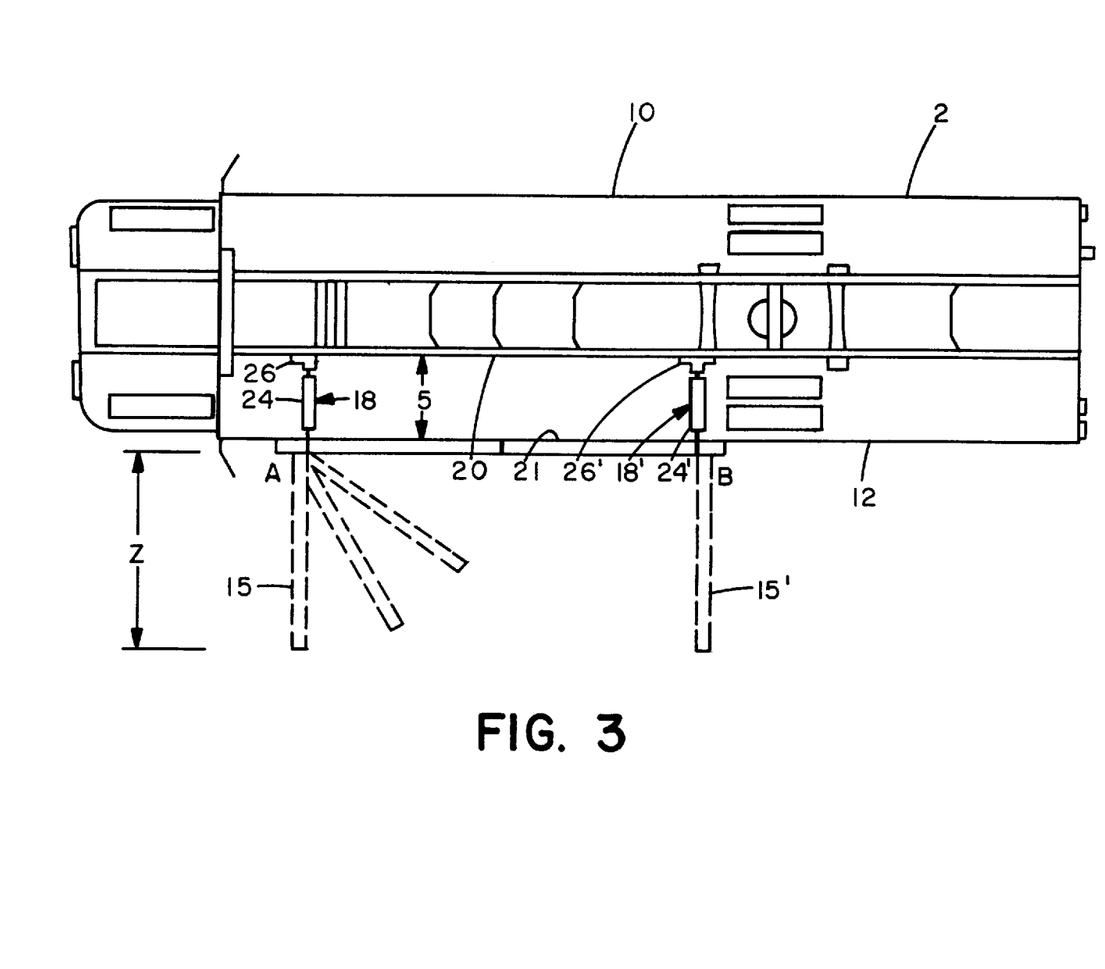
FIG. 3 is a bottom view of the vehicle shown in FIGS. 1 and 2 illustrating the frame and panel structure with the mounts and actuators in a connected condition.
Figure 4:
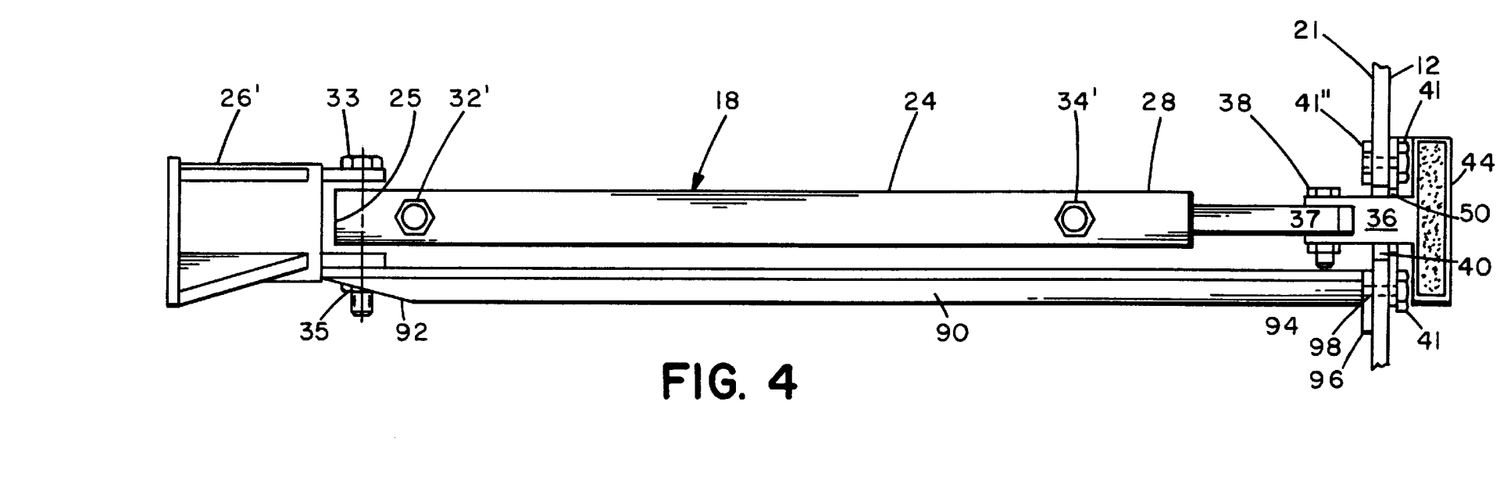
FIG. 4 is a vertical sectional view taken through the side wall panel of the vehicle in FIG. 3 revealing the guard rail mounting means and connected actuator.
Figure 5:
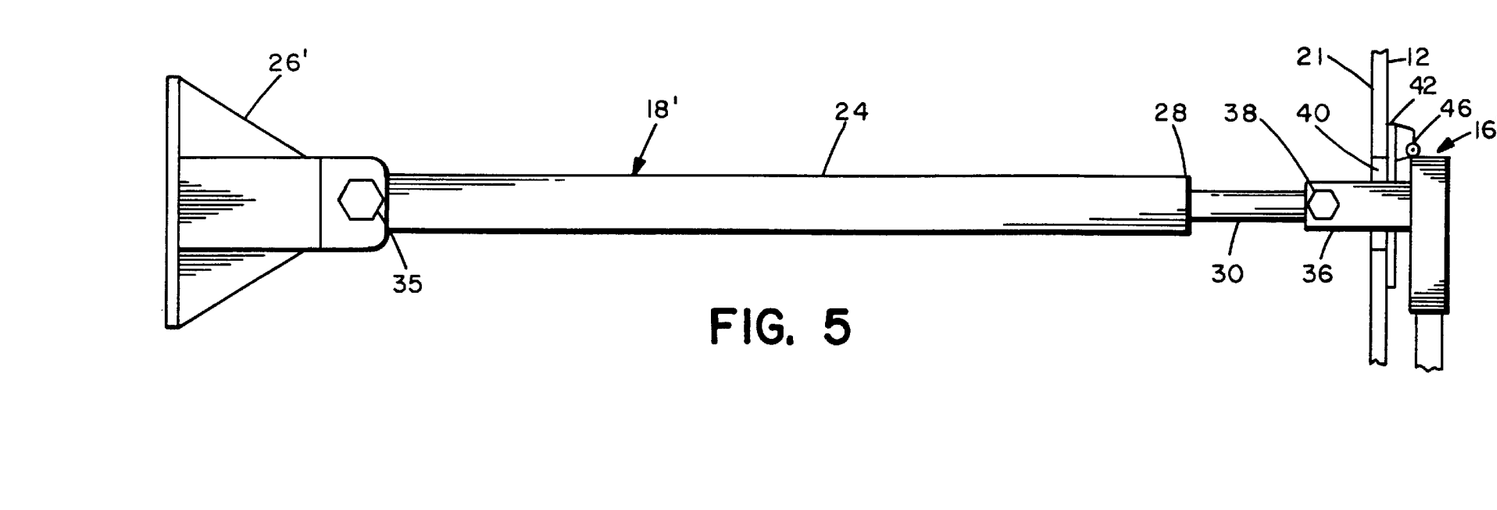
FIG. 5 is a horizontal view taken above the structure of FIG. 4.

Referring now more particularly to FIGS. 3, 4, and 5, it should be seen that each actuator means 18, 18' is comprised of an actuator 24, 24' having a first end 25 which is pivotally connected to mount 26, 26' secured thereto by a pivot bolt 33 and associated connecting nut 35. Each actuator 24 has an opposite outboard end 28 which faces the more immediately outwardly disposed sidewall panel 12. The outboard end 28 of the actuator 24 has a sliding rod 30 disposed therein which is received within the corresponding cylindric confines of the actuator and has a free end 37 driven in reciprocation through the intermediary of pneumatic fluid introduced through ports 32 and 34. The actuators 24, 24' are commercially available products which can be purchased from Monarch Hydraulics Inc. of Grand Rapids, Michigan under part number CD150-10.00-000. The actuators are also sufficiently sized lengthwise, for example, on the order of 12–15 inches, so as to fit substantially perpendicularly to the longitudinal extent of the chassis 20 when in the retracted condition so as to be located within the space S existent between the chassis 20 and the inner surface 21 of the outer panel 12.

As illustrated, each hinge means 16, 16' is mounted via bolting 41, 41 to the side wall panel 12 and includes a mounting block 36 integrally formed therewith for connection to the free end 37 of the sliding rod 30 via a bolted hinge connection at 38. An opening 40 is provided in the side wall panel 12 and is sized to receive the mounting block portion 36 of the hinge means 18. That is, the mounting block portion 36 extends through the opening 40 in the panel 10 in the retracted condition of the hinge as illustrated in FIG. 4 so that the hinge means collapses against the outer surface of the sidewall 12 to effect the streamline configuration of the guard rail 14,14' in the retracted condition.

Figure 6:
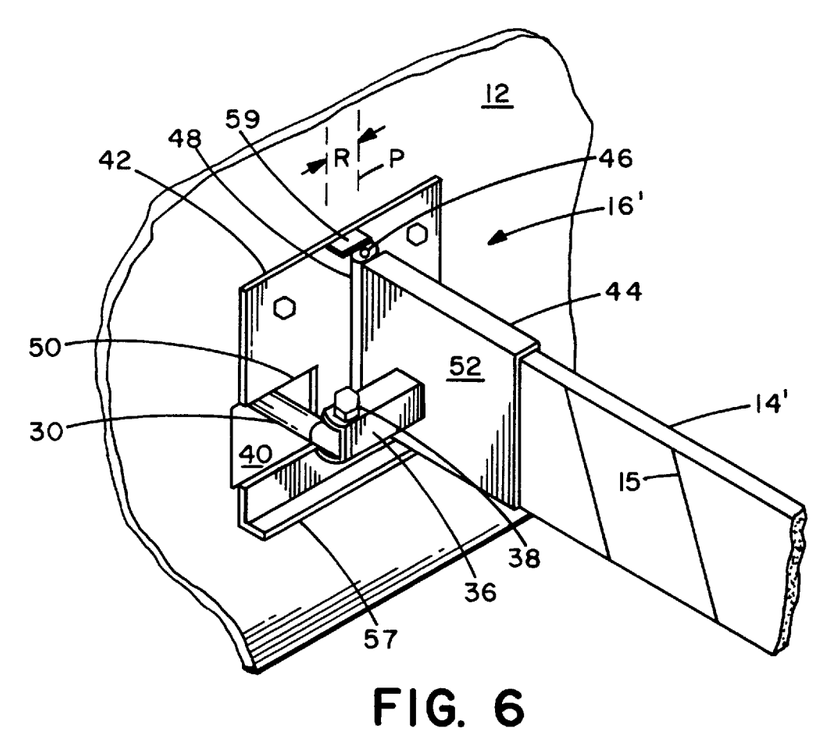
FIG. 6 is a partially fragmentary detailed view showing the hinge and articulated connection as seen from the outside in its deployed condition.
Figure 9A:
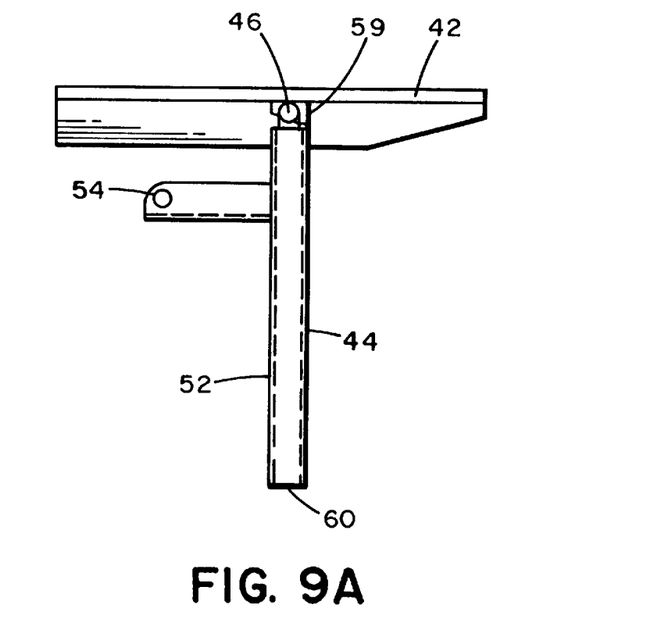
FIG. 9a is a top view of the hinge connecting the guard rail to the bus panel.
Figure 9B:
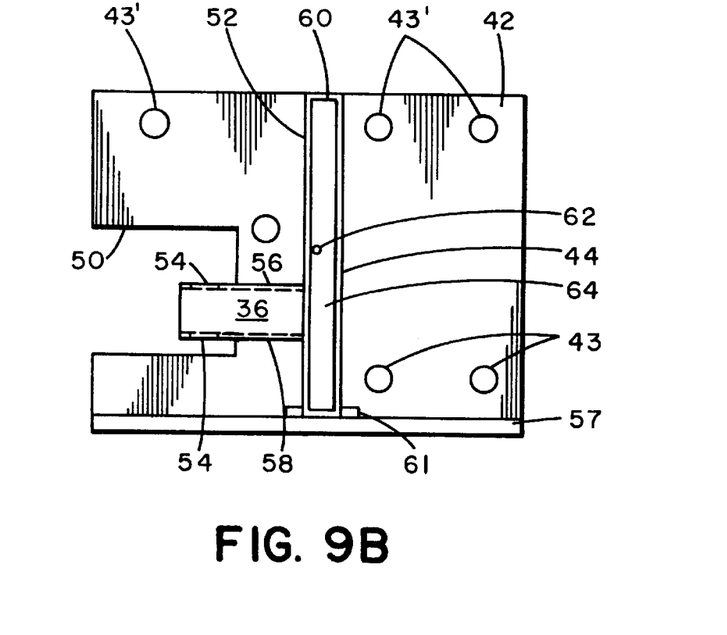
FIG. 9b is a side elevational view of the hinge connecting the guard rail to the bus panel.

Referring now to FIGS. 6, 9a and 9b and more particularly to the hinge means 16, 16', it should be seen that the hinge means 16, 16' is comprised of two relatively movable parts defined respectively by a base plate 42 which is secured to the side wall panel 12 of the vehicle 2 and a socket part 44 which is hingedly connected to the base plate 42 through the intermediary of a vertically oriented connecting pin 46 which is journalled within a cylinder 48 fixed by welding to the closed end of the socket part 44.

The base plate 42 includes a cutout 50 which is superimposed over and is coincident with a corresponding opening 40 formed in the sidewall panel 12 to allow passage of the mounting block portion 36 therethrough.

Integrally formed with the socket part 44 is the mounting block portion 36 which is bifurcated at its free end forming a clevis defined by parts 56, 58 so as to allow connection to the free end 37 of the sliding rod 30. As seen in FIGS. 4,5, and 6, the mounting block portion 36 of the hinge means is integrally connected with the inner surface 52 of the socket part 44 and includes through openings 54,54 formed in the clevis parts 56, 58 into which is disposed a pivot pin or bolt 38. The openings 54, 54 formed in the clevis parts 56, 58 of the mounting block portion 36 allow for a rotational connection between the end 37 of the sliding rod 30 and the mounting block portion 38. Also, the bottom edge of the base plate 42 is directed outwardly at a right angle to create a ledge 57 which supports the socket part 44 as well as providing a securement point for one end of the pin 46. The other end of the pin 46 connects to an outwardly extending tab 59 of the base plate 42. The tab 59 and a stop 61 welded to the base plate 42 cooperate to limit the angular movement of the socket part 44 to about ninety degrees.

As mentioned previously, the cutout 50 in the base plate 42 of the hinge means 14,14' and the opening 40 in the side wall panel 12 are sized to allow passage of the mounting block portion 36 of the socket part to be moved internally of the sidewall panel 12 and into the space S as best illustrated in FIGS. 4 and 5 when the guard rails 14, 14' are disposed in the closed condition. As illustrated in FIG. 6, in the extended condition of the guard rails 14, 14', the sliding rod 30 of the actuator 24 extends outwardly beyond the sidewall panel 12 so as to outwardly rotate the socket part 44 about the pivot pin 46 and the pivot axis P.

The socket part 44 of the hinge means 14, 14' is correspondingly sized and shaped to receive an associated end portion of the guard rail 14,14' so as to cantilever the guard rail outwardly of the side wall panel 12. As can be seen from the drawings, the distance R between the pivot pin 46, e.g. the pivot axis P of the hinge means 16, 16', and the pin axis 38 connecting each actuator 24, 24' to the respective hinge means 16, 16', creates a moment arm of only a few inches. This moment arm is nevertheless sufficient to cause rapid opening and closing of the guard rails 14, 14' due to the lightweight construction of the guard rails 14, 14'. That is, each of the guard rails 14,14' is made from lightweight plastic or PVC which includes a foam plastic insert for support.

In further accordance with the invention, each outer surface of the guard rails 14, 14' is press fit into the inner confines 60 of each socket part 44. Each socket part 44 is provided with a port 62 in the end wall 64 thereof. The port 62 is normally plugged during use. Such plugging of the port 62 after the guard rails have been inserted into the socket parts 44 keeps the guard rail 14, 14' maintained threrewithin due to the creation of a vacuum between the guard rail 14, 14' and the socket part inner confines. It is noted that by applying grease to the outer surface of the guard rails prior to effecting the press fit connection, the insertion process is aided, as well as providing a vacuum barrier therebetween.

As seen in FIGS. 1–3, the safety zone guard 4 is provided with two separately hinged guard rails 14,14'. This is considered to be an optimal design but should not be construed as limiting the invention to a two guard rail system. As seen in FIG. 2, the guard rail 14, i.e., the frontmost one of the guard rails uses a right hand opening hinge, and the guard rail 14', i.e., the rearmost one of the guard rails, uses a left hand opening hinge. In this way, the two guard rails can be closed and opened substantially simultaneously with one another to create spaced perpendicularly extending barriers which create the zone Z along the traffic path 5.

A stabilizing arm 90 (see FIGS. 4 and 5) may also be provided as in conjunction with each actuator means 18, 18', and each may also be respectively mounted to the mounts 26, 26' and a corresponding localized area of the side wall panel 12. The stabilizing bar 90 is necessary on vehicles wherein the side panel 12 is not sufficiently rigidly structurally braced as between the spacing S of the chassis and thus provides localized support for the side wall panel in the region of the associated hinge means 16, 16'. For this purpose, the stabilizing arm 90 at one end 92 has an opening which receives a portion of the locking bolt 33 which is held in place by an associated locking nut 35 which clamps the end 92 against a corresponding flat portion of each mount 26, 26'. At the other end 94 of the arm 90 is a flange 96 which extends transversely of the length of the arm 90 and is welded thereto. The flange 96 of the arm 90 includes openings 98 therein which are aligned with corresponding openings 43,43 in the base plate 42 of the hinge 16 so that the entire hinge means 16, 16' assembly can be clamped together through corresponding openings in the side wall panel 12 by bolts 41, 41.

Additional bolts 41' may also be used to secure the hinge means 16, 16' to the side wall panel 12 by passing each through additional openings 43' in the base plate 42 and securing same with a nut 41".

Figure 7:
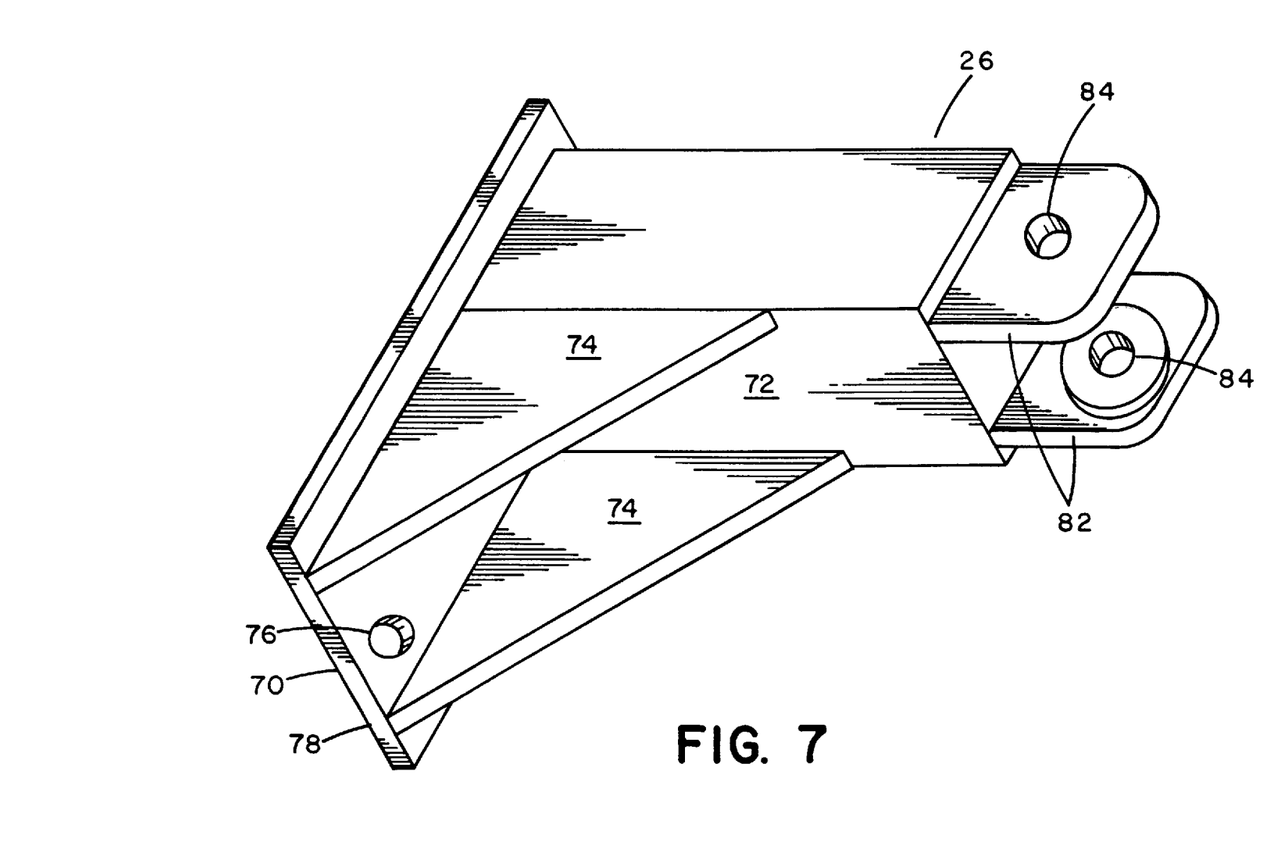
FIG. 7 is a perspective view of the front actuator mount.
Figure 8:
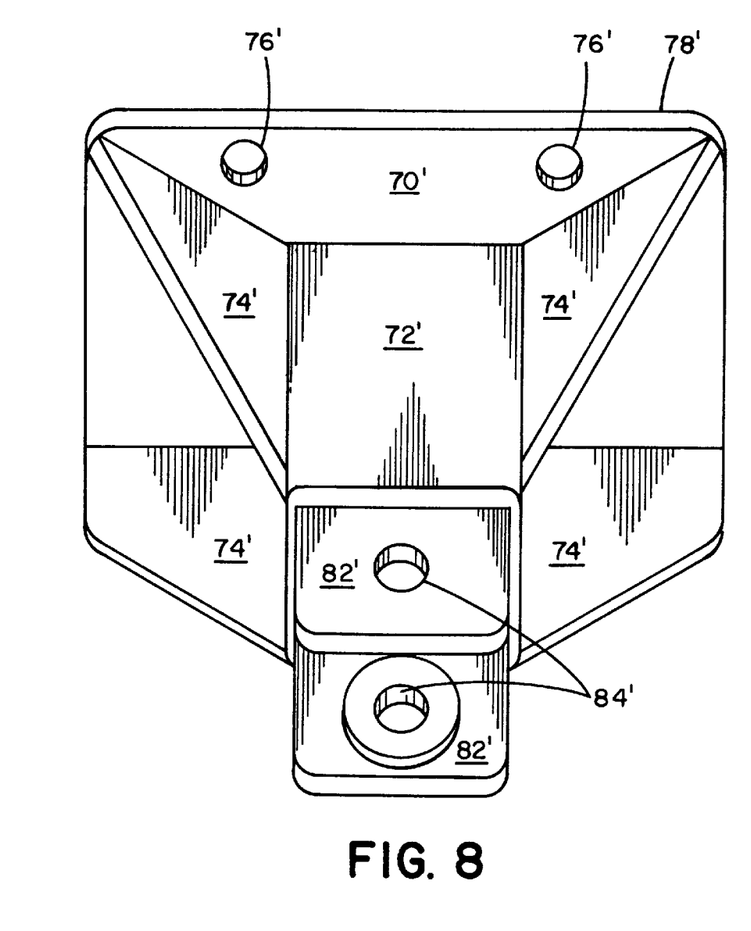
FIG. 8 is a perspective view of the rear actuator mount.

Referring now to FIGS. 7 and 8, and to the mounts 26, 26' used to connect the actuators to the chassis 20, it should be seen that the front actuator mount 26 is constructed differently from the rear actuator mount 26'. The front actuator mount 26 has an offset design comprised of a base portion 70, an offset arm 72 and bracing members 74,74 which when welded together, yield a highly rigid and strong mount for the actuator 24. The base portion 70 includes openings 76, 76 which, when the inner surface 78 of the base portion 70 is abutted against a correspondingly flat outer surface of the chassis 20, receive bolts connecting the mount to the chassis. At the end of the offset arm 72 there is provided a fixed pair of flange members 82,82 each of which has an aligned opening 84 formed therein through which is disposed the connecting pivot bolt 33. The offset of the arm portion 72 relative to the base portion 70, allows the mount 26 to be disposed in a frontmost proximate position.

Referring now to FIG. 8, it should be seen that the rear mount 26' is comprised of essentially identical parts as found in the front mount 26, except that the arm portion 72' is not offset relative to the position of the base portion arm portion 72' because in the rear vicinity of the vehicle, space for bracing fore and aft is not problematic, as it is in the forward end of the vehicle.

Figure 10:
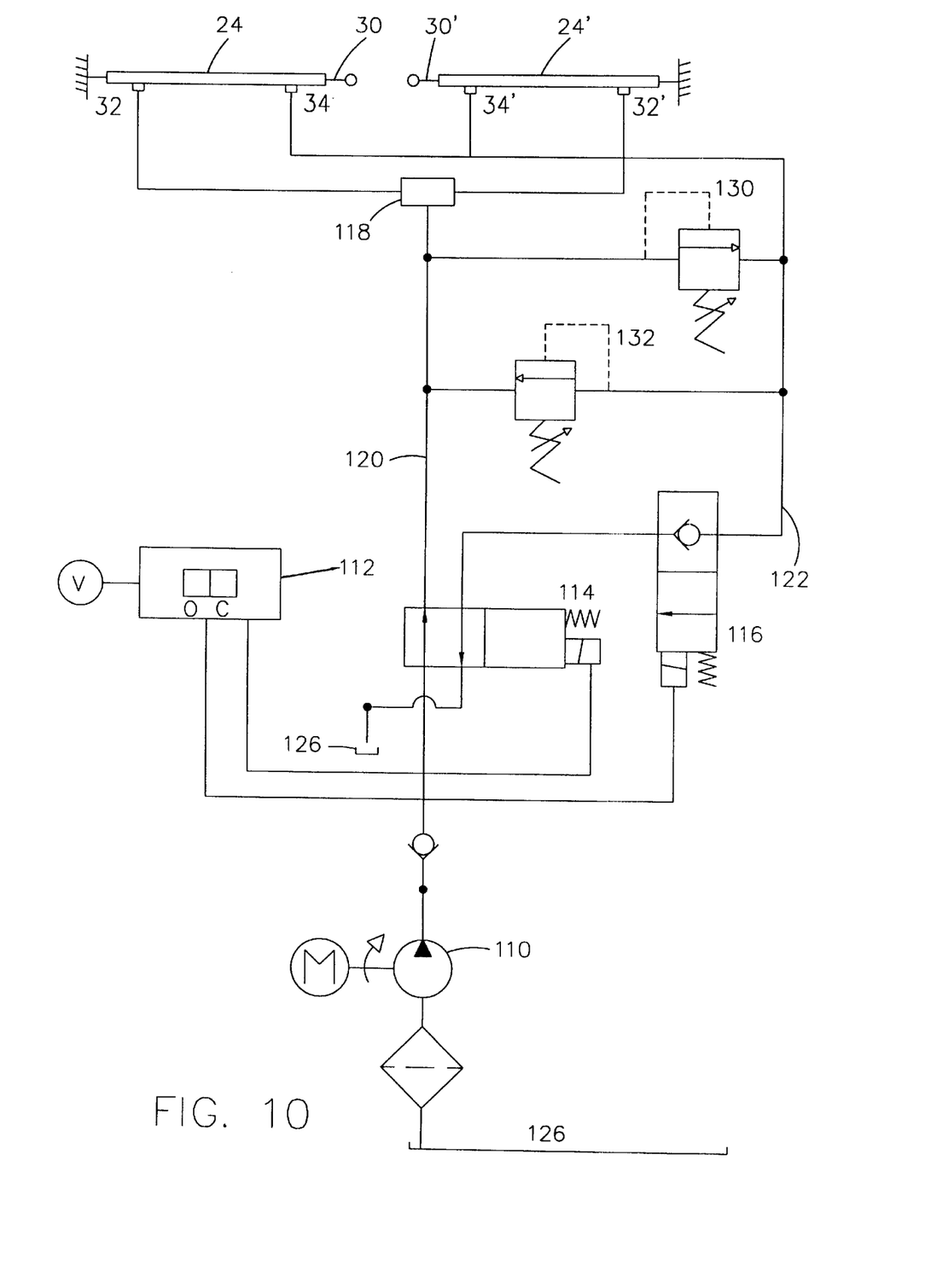
FIG. 10 is a schematic view of the hydraulic controls operating the system of the present invention.

Referring now to FIG. 10, and to the schematic for operating the dual guard rail system, it should be seen that the system used is a commercially available hydraulic system which is commercially sold by J.S. Barnes of Rockford, Ill. under part number 1073. The actuators (24 hereinafter referred to as the front actuator) and (24' hereinafter referred to as the rear actuator) each is a double acting actuator having ports 32, 34 associated with the front actuator and ports 32' 34' associated with the rear actuator. The system includes a pump 110 and a switch 112 connected to a first electromechanical valve 114 and to a second electromechanical valve 116 for controlling articulation thereof. Fluid line 120 passes through the valve 114 and connects to ports 32, 32' in each of the actuators 24, 24' through a flow control valve 118 which introduces fluid substantially equally into ports 32, 32"respectively of the actuators 24 and 24'. Ports 34, 34' of the actuators 24, 24' connect in parallel to the second valve 116 through line 122 and then to reservoir 126.

To move the guard rails to open conditions, first valve 114 is caused to be maintained in a parallel flow condition as is illustrated while the second valve 116 is caused to be moved to an open to flow condition. In this way, fluid passes through the line 120 from the pump 110 and fills the actuators 24, 24' through ports 32, 32'. Exiting fluid from ports 43, 43' is moved through line 122, through switches 116 and 114 and then to reservoir 126. In order to move the guard rails 14, 14' to the closed condition, valve 114 is moved to effect a cross flow condition, while valve 116 is moved to the one way flow condition. Thus, fluid from the pump 110 is pumped into line 122 and then into ports 34, 34', while fluid within the actuators 24, 24' is drained through line 120 and into the reservoir 126. Relief valves 130 and 132 are provided to limit the pressure build up in the system once the actuators are moved to the fully retracted or fully extended conditions.

By the foregoing, an improved vehicular safety zone device is disclosed by way of the preferred embodiment. However, numerous modifications and substitutions may be had without departing from the spirit of the invention. For example, each guard rail 14,14' may be equipped with a motion sensor and for sensing an approaching vehicle and sounding an alarm to the driver. Accordingly the invention has been described by way of illustration rather than limitation.

We claim:

1. In a vehicle having a frame extending substantially in a lengthwise direction and having a sidewall panel disposed outwardly thereof defining a space therebetween, a device comprising:

a mount secured to said frame;

hinge means disposed on a support surface of said side wall panel and secured thereto for mounting an elongated rail to said vehicle for angular movement relative thereto;

said sidewall panel having a passage formed therein permitting communication between said support surface of said sidewall panel and said space;

actuator means located substantially within said space and connected between said mount and said hinge means for moving a part of said hinge means between an angular first position and an angular second position; and control means for selectively controllably causing said actuator means to move said part of said hinge means between said angular first and second positions.

2. The combination of claim 1 further characterized by said actuator means including a double acting actuator having a slider rod with a free end pivotally connected to said hinge means.

3. The combination as set forth in claim 2 further characterized by said hinge means having a socket part and a mounting block part extending inwardly perpendicularly thereto;

said the mounting block part having a length sufficient to pass through said passage in said sidewall panel of said vehicle when the hinge means is in a first angular position.

4. The combination set forth in claim 3 further characterized by a guard rail being mounted within said socket part of said hinge means.

5. The combination as defined in claim 4 further characterized by said first angular position corresponds to the orientation of said socket part being disposed substantially parallel with said sidewall panel and said second angular position corresponding to the orientation of said socket part being disposed substantially perpendicularly to said sidewall panel.

6. The combination as defined in claim 1 further characterized by a stabilizing arm extending between said mount and said sidewall panel.

7. The combination as defined in claim 6 further characterized by said stabilizing arm having one end connected to said hinge means through said sidewall panel.

8. The combination as defined in claim 1 further characterized by said device having another mount secured to said frame;

another hinge means disposed on another support surface of said side wall panel and secured thereto for mounting an elongated rail to said vehicle for angular movement relative thereto;

said sidewall panel having another passage formed therein permitting communication between said another support surface of said sidewall panel and said space;

another actuator means disposed within said space and connected between said mount and said hinge means for moving a part of said another hinge means between an angular first position and an angular second position; and said control means causing said actuator means to move said part of said another hinge means between said angular first and second positions.

9. The combination as set forth in claim 8 further characterized by said hinge means comprising a right hand opening hinge and said another hinge means comprising a left hand opening hinge.

10. The combination as defined in claim 9 further characterized by said control means causing simultaneous energization and reverse energization of said one and another actuators.

11. The combination as defined in claim 10 further characterized by said one and another actuators being pneumatic actuators and a flow control valve being provided to substantially split the flow of fluid therebetween from a single source of hydraulic pressure.

12. The combination as defined in claim 1 further characterized by said hinge means including a socket part defining an internal confine, said internal confine being correspondingly sized and shaped to receive the outer surface of one end of a guard rail inserted therewithin in an interference fit, said socket part including a port and a plug allowing air to be evacuated therefrom as the guard rail is inserted therewithin, and wherein said plug seals said internal confine to atmosphere after the guard rail is inserted.

13. The combination as defined in claim 10 further characterized by said one and said another mounts being self-standing elements connected to said frame by bolting.

14. The combination as defined in claim 13 further characterized by said one mount having an offset part.

15. The combination as defined in claim 8 further characterized by another stabilizing arm extending between said another mount and said sidewall panel.

16. The combination as defined in claim 15 further characterized by said another stabilizing arm having one end connected to said another hinge means through said sidewall panel.

17. The combination as defined in claim 16 further characterized by said one and another stabilizing arms are spaced from each other along the length of the vehicle.

18. The combination as defined in claim 12 further characterized by said guard rails being formed from a substantially rigid plastic material with a foamed plastic interior.

* * * * *